P. McINTYRE.
Improvement in Tile-Molds.
No. 128,498.
Patented July 2, 1872.
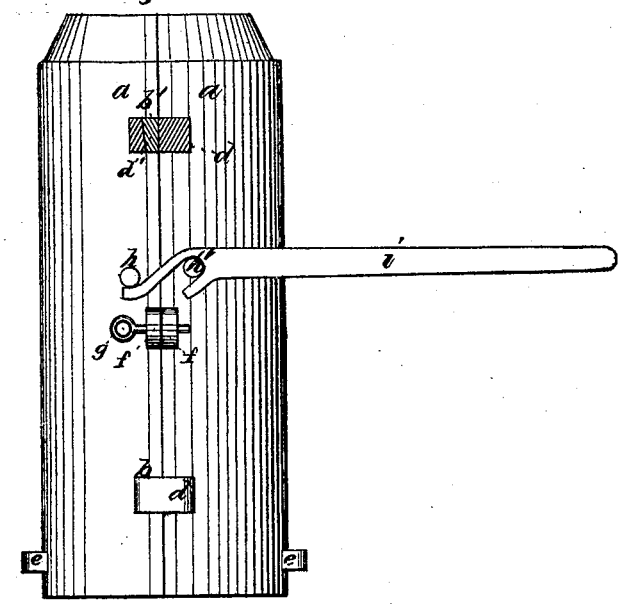
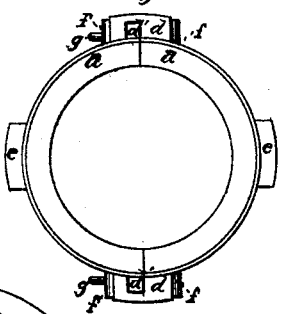
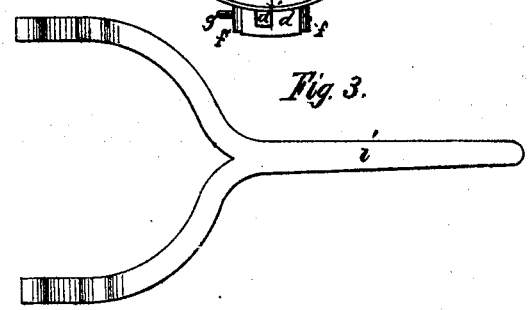
Witnesses.
Inventor.

128,498

UNITED STATES PATENT OFFICE.

PETER McINTYRE, OF NORWICH, ASSIGNOR TO THE HARTFORD DRAIN-PIPE-MACHINE COMPANY, OF HARTFORD, CONNECTICUT.

IMPROVEMENT IN TILE-MOLDS.

Specification forming part of Letters Patent No. 128,498, dated July 2, 1872.

*To all whom it may concern:*

Be it known that I, PETER McINTYRE, of Norwich, county of New London and State of Connecticut, have invented certain new and useful Improvements in Tile-Mold; and to enable others skilled in the art to make and use the same I will proceed to describe, referring to the drawing, in which the same letters indicate like parts in each of the figures.

The nature of this invention consists in the manner of fastening the two parts of the mold together; and also in the manner of disengaging one part from the other.

Figure 1 is a side view, showing this improvement. Fig. 2 is a top view of the same. Fig. 3 shows a top view of a forked lever for disengaging one part from the other.

$a\ a$ is a two-part mold, the inside shape of which is very much the same as those now in common use. $b\ b'$ are the fastening devices, one of which, $b'$, is cut away so as to show in section the construction and manner of fastening. $d$ are bosses formed on or secured to one part of the mold, projecting over the joint of the two parts of the mold, and serve to bring the two parts together and hold them in uniform position one with the other. These bosses $d$ are provided with a dovetail orifice to receive a dovetail tenon or wedge-shape boss, $d'$, formed on the opposite part of the mold, so that by lifting one part (the part having the dovetail tenon or wedge-shaped boss) to allow the tenons $d'$ to enter the orifice in the bosses $d$, then letting it drop, the two parts will become firmly and securely clasped together. $e\ e$ are bosses formed on the outside surface of the mold, by means of which it is held firmly in the stocks in the common way. $f\ f$ are bosses formed closely to the joint on each part of the mold, having an orifice formed directly through the two bosses $f\ f$ to receive a pin, $g$, on each side of the mold, to prevent endwise motion of one part separate from the other. $h\ h'$ are projecting pins formed near the joint, on each side and on each half of the mold. $i$ is a forked lever, the outer ends of its prongs bearing on the under side of the pins $h$ of one part of the mold, while they rest or have their fulcrums on the pins $h'$ on the opposite half of the mold, so that, when the pins $g$ are removed and the bosses $e$ are turned out of the stocks, by bearing upon the lever $i$ one part will be lifted or unclasped from the other, thus producing a mold more convenient and perfectly secure for use.

What I claim, and desire to secure by Letters Patent, is—

1. The lever $i$, in combination with the pins $h\ h'$ and mold $a\ a$, substantially as and for the purpose set forth.

2. I claim the mortise and dovetail clasps $b\ b'$, in combination with the mold $a\ a$, substantially as set forth.

PETER McINTYRE.

Witnesses:
   E. W. BLISS,
   JEREMY W. BLISS.